(12) United States Patent
Fleury

(10) Patent No.: US 7,190,365 B2
(45) Date of Patent: Mar. 13, 2007

(54) METHOD FOR NAVIGATING IN A MULTI-SCALE THREE-DIMENSIONAL SCENE

(75) Inventor: Simon G. Fleury, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 284 days.

(21) Appl. No.: 09/948,027

(22) Filed: Sep. 6, 2001

(65) Prior Publication Data

US 2003/0043170 A1 Mar. 6, 2003

(51) Int. Cl.
*G06T 15/10* (2006.01)
*G09G 5/00* (2006.01)

(52) U.S. Cl. ...................... 345/427; 345/648
(58) Field of Classification Search ........ 345/419–628, 345/679, 856, 652, 678, 663
See application file for complete search history.

(56) References Cited

U.S. PATENT DOCUMENTS

| | | | |
|---|---|---|---|
| 5,276,785 A * | 1/1994 | Mackinlay et al. | 345/427 |
| 5,511,157 A * | 4/1996 | Wang | 345/652 |
| 5,513,303 A * | 4/1996 | Robertson et al. | 345/419 |
| 5,689,628 A * | 11/1997 | Robertson | 345/427 |
| 5,798,761 A * | 8/1998 | Isaacs | 345/419 |
| 5,812,493 A * | 9/1998 | Robein et al. | 367/25 |
| 6,012,018 A | 1/2000 | Hornbuckle | |
| 6,035,255 A | 3/2000 | Murphy et al. | |
| 6,070,125 A | 5/2000 | Murphy et al. | |
| 6,128,577 A | 10/2000 | Assa et al. | |
| 6,138,075 A | 10/2000 | Yost | |
| 6,215,499 B1 | 4/2001 | Neff et al. | |
| 6,369,812 B1 * | 4/2002 | Iyriboz et al. | 345/419 |
| 6,535,232 B1 * | 3/2003 | Tsuda et al. | 715/849 |

FOREIGN PATENT DOCUMENTS

WO    WO 02/21158    3/2002

\* cited by examiner

*Primary Examiner*—Ryan Yang
(74) *Attorney, Agent, or Firm*—Osha Liang; Bryan L. White; Kevin P. McEnaney

(57) ABSTRACT

A method for navigating a 3D scene in a viewing area includes associating a point of interest with a reference shape, which is related to the shape of the 3D object, and displaying a scene according to a user-requested action, while keeping the point of interest within the reference shape and within the viewing area. The user-requested action may include translation, rotation, and zooming. The point of interest may include scene information such as a magnification factor, local orientation, and global orientation. The methods for performing a user-requested action in a 2D representation of a 3D object include determining a distance between a point of interest and a viewpoint; determining an amount of movement from a user input; and performing the user-requested action at a rate based on the amount of movement from the user input multiplied by a distance factor based on the distance between the point of interest and the viewpoint. A system for displaying a 3D object includes a 2D display for displaying the 3D object and a computer operatively coupled to the 2D display, the computer having a program to display the 3D object on the 2D display, the program adapted to enable translation, zoom, and rotation of the representation while restricting a point of interest within a reference shape and within a viewing window on the 2D display.

25 Claims, 9 Drawing Sheets

METHOD FOR NAVIGATING IN A MULTI-SCALE THREE-DIMENSIONAL SCENE

FIELD OF THE INVENTION

The present invention relates to techniques for navigating a three-dimensional scene on a display.

BACKGROUND OF THE INVENTION

Three-dimensional (3D) objects are commonly represented on computer displays in two dimensions (2D). Such computer displays allow users to view the 3D objects by rotating, translating, or zooming in and out of the displayed scenes. The rotation, translation, and zooming will be referred to generally as a user-requested action (i.e., the user-requested action as used herein refers to "motions" and does not include color/lighting changes or texture mapping changes). Most prior art 3D visualization software packages respond to the user-requested actions by moving the viewpoint (observer eyes or camera) around a 3D scene. For rotation and zooming operations, these are performed with respect to a pivot point, which is typically the point of interest (POI). The POI is either set at the center of the display by default or is selected by a user through an input device (e.g. a mouse or a keyboard). When the user selects a location on the 2D display as the POI, the viewer typically attempts to associate the POI with the closest point on the 3D object. However, due to the imperfection of mapping a 3D object onto a 2D display, the POI is often not placed on the 3D object. Such imperfection results in a separation (offset) between the POI and the 3D object. The offset is usually insignificant and unnoticeable initially. However, the offset may become apparent after rotation or zooming. As a result, the region of interest on the 3D object will be displaced to the side of the viewing area, or completely lost from the viewing area after rotation or zooming.

FIGS. 1A and 1B illustrate such a problem. In FIG. 1A, a thread-like 3D object 11 is mapped to a 2D display (a viewing window) 10. In a typical viewer, the point of interest (POI) 12 is mapped to a point on the 3D object 11 around the center of the window 10. As discussed above, due to the difficulty in mapping a 3D object 11 on to the 2D display window 10, the POI 12 is often not mapped precisely on the 3D object 11. The imprecision results in the placement of the POI 12 at a location with a small offset from the intended location on the 3D object. This offset is usually too small to be noticed in the scene (see FIG. 1A) until a zooming or rotation operation is performed on the 3D object 11. This POI 12 is the pivot point for zooming and rotation operations. FIG. 1B illustrates a scene after a zooming operation. The "small" offset in FIG. 1A is now quite obvious in FIG. 1B. As a result of this offset, the 3D object 11 is now displaced from the center and appears in the corner of the display window 10 (FIG. 1B). The same problem can also occur in a rotation operation because of the change in the viewing angle. In FIG. 1A, the POI 12 may seem to coincide with the 3D object 11. However, the coincidence might simply be due to fortuitous alignment along the line of sight, and the separation between the POI 12 and the 3D object 11 may become noticeable upon rotation. If this happens, the 3D object 11 will be displaced to the side of the viewing window 10 like that shown in FIG. 1B. To bring the 3D object 11 back to the center of the window 10, the user typically needs to perform a translation operation. This extra step can be annoying and time consuming, especially when frequent zoom and rotation operations are performed on the 3D object.

U.S. Pat. No. 5,276,785 issued to MacKinlay et al. discloses a method to reduce this problem. In this method, when a user moves the POI, a circle or other shape on the object's surface is presented to assist the user in positioning the POI. This method reduces the possibility that the POI will be placed outside of the 3D object. In a related approach, U.S. Pat. No. 5,798,761 issued to Isaacs discloses methods for mapping 2D cursor motion onto 3D scenes by employing auxiliary 3D lines and planes as guides. However, these guide lines and planes do not always map the cursors onto the 3D object.

The problem illustrated in FIG. 1B is exacerbated if the 3D object has disproportionate dimensions, i.e., with one dimension much larger than the other dimensions (such as a thread-like object, see 11 in FIG. 1A). Such thread-like 3D objects may include oil-well trajectories, pipelines, pipeline networks, road networks in 3D (maps in relief), deoxyribonucleotides (DNA) molecules, ribonucleotides (RNA) molecules, to name a few. For example, an oil-well trajectory may have a length of up to a mile or more and a diameter of one foot or less. The trajectory is typically represented as a succession of cylinders, connected together and oriented according to the deviation and azimuth of the well so that it forms a long and thin cylinder. In order to locate and observe a small area in detail, a user needs to zoom in and zoom out of the scene often, and the problem illustrated in FIG. 1B will occur frequently using the existing display tools.

Another issue is that most display tools perform the user-requested operations with the same amounts of motion regardless of how close or how far away the viewer is to the object. This mode of operation makes it difficult to move the viewpoint accurately in the neighborhood of the object while having a reasonable speed of response when far from it. U.S. Pat. No. 5,513,303 issued to Robertson et al. discloses a two-phase motion. In the first phase, the movement is gradually accelerated as the duration of the motion increases. In the second phase, the movement follows an asymptotic path. Similarly, U.S. Pat. No. 5,276,785 issued to Mackinlay et al. discloses methods using asymptotic or logarithmic motion functions to provide variable rate of motion.

It is desirable that a display tool for viewing a 3D object be able to maintain the point of interest on the object, with the 3D object preferably remaining at the center of the window and providing navigation in the 3D scene that is responsive to the degree of magnification.

SUMMARY OF INVENTION

One aspect of the invention relates to methods of navigating a three-dimensional scene in a viewing area. The methods include associating a point of interest with a reference shape, which is related to the 3D object, and displaying a scene according to a user-requested action, while keeping the point of interest within the reference shape and within the viewing area. The user-requested action may include translation, rotation, and zooming. The point of interest may include scene information such as a magnification factor, local orientation, and global orientation.

Another aspect of the invention relates to methods for performing a user-requested action in a three-dimensional display. The methods comprise determining a distance between a point of interest and a viewpoint; determining an amount of movement from a user input; and performing the user-requested action at a rate based on the amount of movement from the user input multiplied by a distance factor based on the distance between the point of interest and the viewpoint.

Another aspect of the invention relates to systems for displaying 3D objects. A system according to embodiments of the invention may include a 2D display for displaying the 3D object and a computer operatively coupled to the 2D display. The computer has a program to display the 3D object on the 2D display, wherein the program is adapted to enable translation, zoom, and rotation of the representation while restricting a point of interest within a reference shape and within a viewing window on the 2D display.

Other aspects and advantages of the invention will be apparent from the accompanying descriptions and drawings.

DETAILED DESCRIPTION

Embodiments of the present invention relate to user-friendly 3D displays. The embodiments use reference shapes, which track the shapes of the 3D objects under observation, to limit the movement of the points of interest (POI) in performing the user-requested operations (translation, rotation, and zooming). The reference is related to the 3D object in a sense that it may have a shape similar to that of the 3D object and/or its dimension may track that of the 3D object. Furthermore, the coordinates of the reference shapes are linked with the corresponding 3D objects such that they move in concert on the 3D displays. These embodiments are most suitable for, but not limited to, displaying 3D objects that have disproportionate dimensions, e.g., the trajectory of an oil well, which typically spans up to a mile in length and yet has a diameter less than one foot. Such disproportionate dimensions make it necessary for a user to frequently zoom out to keep track of the orientation and location of the region of interest and to zoom in to view the region with sufficient details. Embodiments of the invention comprise tethering the reference shapes to the 3D objects and moving the point of interest (POI) along the reference shapes. The camera (viewpoint) is positioned so that the POI remains within the viewing area, which can be an entire display screen or a window where the 3D viewer is operated. The POI can be fixed at a point within the viewing area or be allowed to move around in the viewing area.

In one embodiment, the POI may be fixed at the center of the viewing area. In this embodiment, movement (e.g., translation) of the 3D object may be accomplished by threading (gliding or moving) the reference shape (together with the "tethered" 3D object) through this centrally located POI. Similarly, rotation and zooming may be achieved by holding the POI fixed on the corresponding point on the reference shape, hence the 3D object. Then, the camera (viewpoint) can be moved closer or farther from the 3D object (zoom effect) or be rotated around the 3D object (rotation or all-angle observation). Any methods known in the art for performing the zooming, rotation, and translation operations may be employed. With this embodiment, the POI with its associated point on the reference shape will also remain at the center of the viewing area irrespective of the operation (i.e., translation, rotation, or zooming). Therefore, the 3D object will never disappear from the viewing area or be displaced from the center of the viewing area. Consequently, users do not need to perform extra operations to bring the 3D object back in the viewing area. The method of tethering the POI with a reference shape that is linked with the 3D object is unlike prior art methods, which typically attempt to attach the POIs onto the 3D objects in an ad hoc fashion in response to user inputs.

Figure 1A:
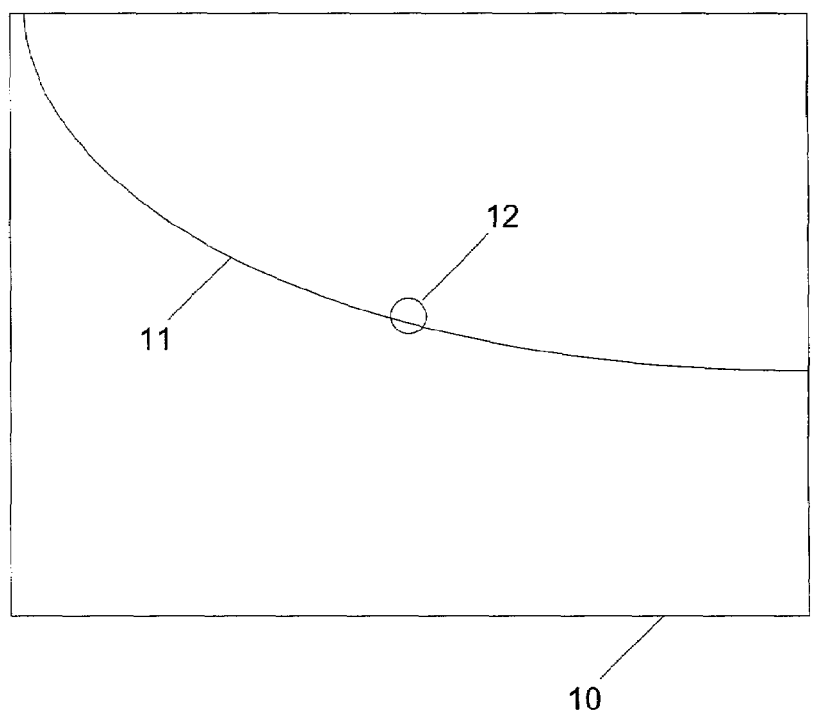
FIGS. 1A and 1B are diagrams illustrating a problem associated with most prior art viewers in navigating a three-dimensional scene
Figure 1B:
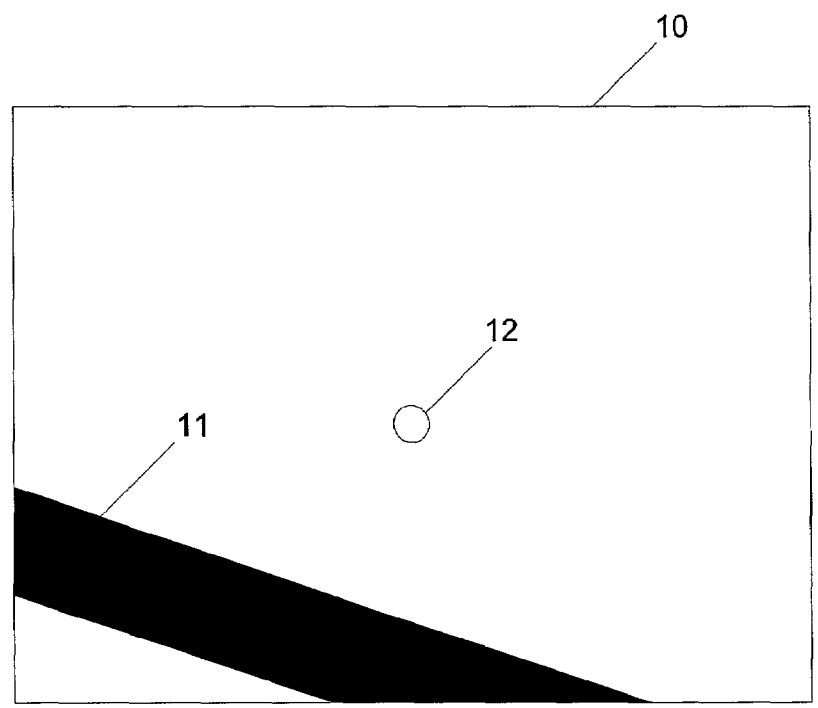
Figure 2:
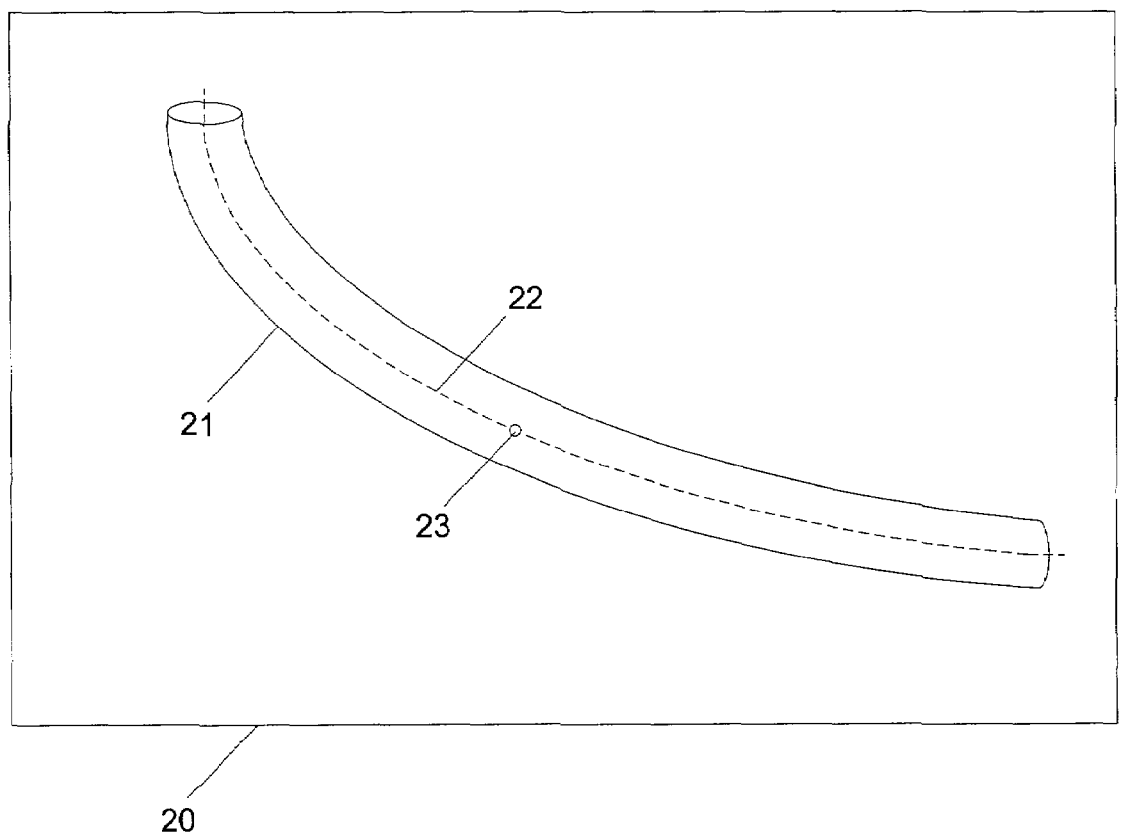
FIG. 2 is a diagram illustrating the association of a three-dimensional object, a reference shape, and a point of interest according to an embodiment of the invention.

FIG. 2 illustrates such an embodiment using a well trajectory 21 as the 3D object. In this embodiment, a reference shape 22 is a curved line ("wire") lying along the longitudinal axis of the well trajectory 21. This longitudinal axis runs along the center of the well trajectory 21. However, it is not necessary that this wire or curvilinear reference shape 21 be located at the longitudinal axis of the trajectory. For example, it may be slightly offset from the longitudinal axis, located on the wall of the well, or located somewhere outside, but near, the well. In the embodiments of the invention, the point of interest (POI) 23 is tethered to the reference shape 22 and is restricted to move along this reference shape 22 during operation. Thus, translation of the 3D object 21 in the viewing area can be performed by "threading" (or gliding) this curvilinear reference shape (wire) 22 through the POI 23, while keeping the POI 23 within the viewing area. Although it is easier to implement the embodiments of the invention by holding the POI 23 at a fixed location (especially, at the center) in the viewing window 10, the invention is equally applicable in situations where the POI 23 is allowed to move within the viewing window 10. In rotation or zooming, the POI 23 stays at a point on the curvilinear reference shape 22, while the viewpoint (camera) is moved closer to, farther from, or around the 3D object 21. In this embodiment, the 3D object 21 will always remain within the viewing area, allowing the region of trajectory to be easily observed.

The invention may be better understood by envisioning that the POI 23 or the viewing window 20 is held fixed with respect to the external coordinate, while the reference shape together with the 3D object is moved (threaded or zipped) through the POI 23. In other words, the user-requested action is accomplished by changing the coordinates of the reference shape and the 3D object relative to the external coordinates of the viewing window 20 or the POI 23. At the same time, such movements are confined such that only points within the reference shape can zip or thread through the POI 23. In this manner, the POI 23 will always stay within the reference shape. While the above-described approach permits a continuous movement of the POI 23 within the reference shape 22, an alternative approach is to move the POI 23 directly to a location within the reference shape 22 in the vicinity of the user-requested POI location, i.e., in a discrete step rather than a continuous movement.

Although the example in FIG. 2 uses a wire (or a curvilinear shape) as the reference shape 22, it is not necessary that the reference shape be a "thin wire." For example, a 3D reference shape may be a cylinder (i.e., a "thick wire") or a cylindrical surface (i.e., a pipe or tube) that follows the shape of the well trajectory. The radius of such a cylinder or a cylindrical surface may be smaller than, similar to, or slightly greater than that of the well trajectory. In these embodiments, the POI will be permitted to move within the cylinder or on the cylindrical surface. Those skilled in the art will appreciate that the invention can be implemented with any prior art procedures that can perform such movements (i.e., relative coordinate changes).

Figure 3:
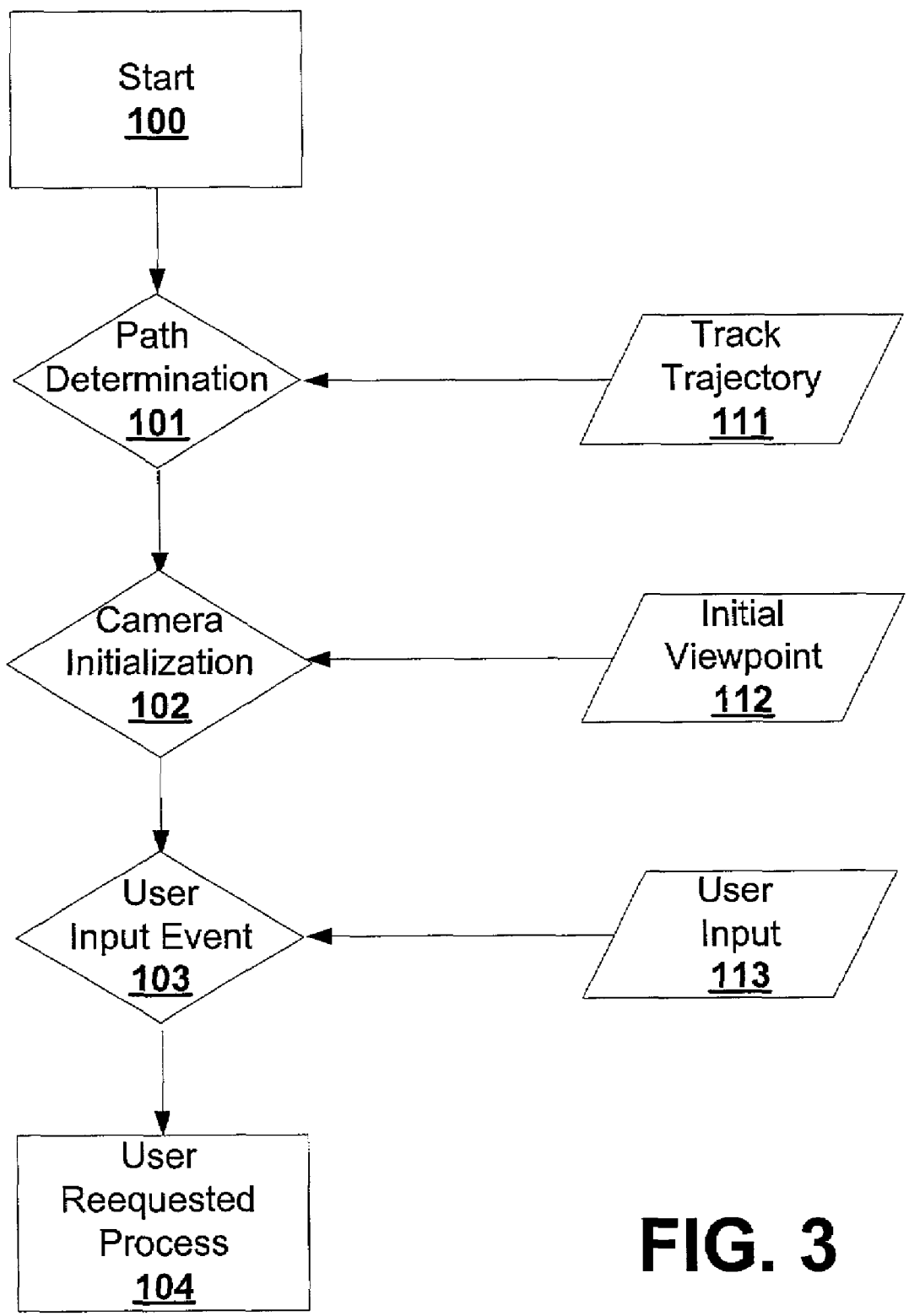
FIG. 3 is a flow-chart diagram illustrating a method according to an embodiment of the invention.

For example, FIG. 3 illustrates one embodiment of the invention. Step 100 represents the beginning of the process, which then triggers a subroutine 101 that determines a reference shape (or path) within which the POI 23 (see FIG. 2) will be permitted to travel. In determining the path, the program takes the coordinates of the 3D object (e.g., a track trajectory 111) as an input. Once the reference shape (path) is determined, the program initializes the camera position (initial viewpoint 112), which could either be a value provided by the user or a default value (e.g., at the center of the 3D object or the computed reference shape). At this stage, the 3D object is displayed in the viewing window and ready to be manipulated by the user, and a user input event subroutine 103 awaits user input 113. Upon receiving user input 113, the user input event subroutine 103 determines the type of the processes (translation, rotation, or zoom) requested by the user and sends the process to a process handler 104 to execute the requested event.

Figure 4:
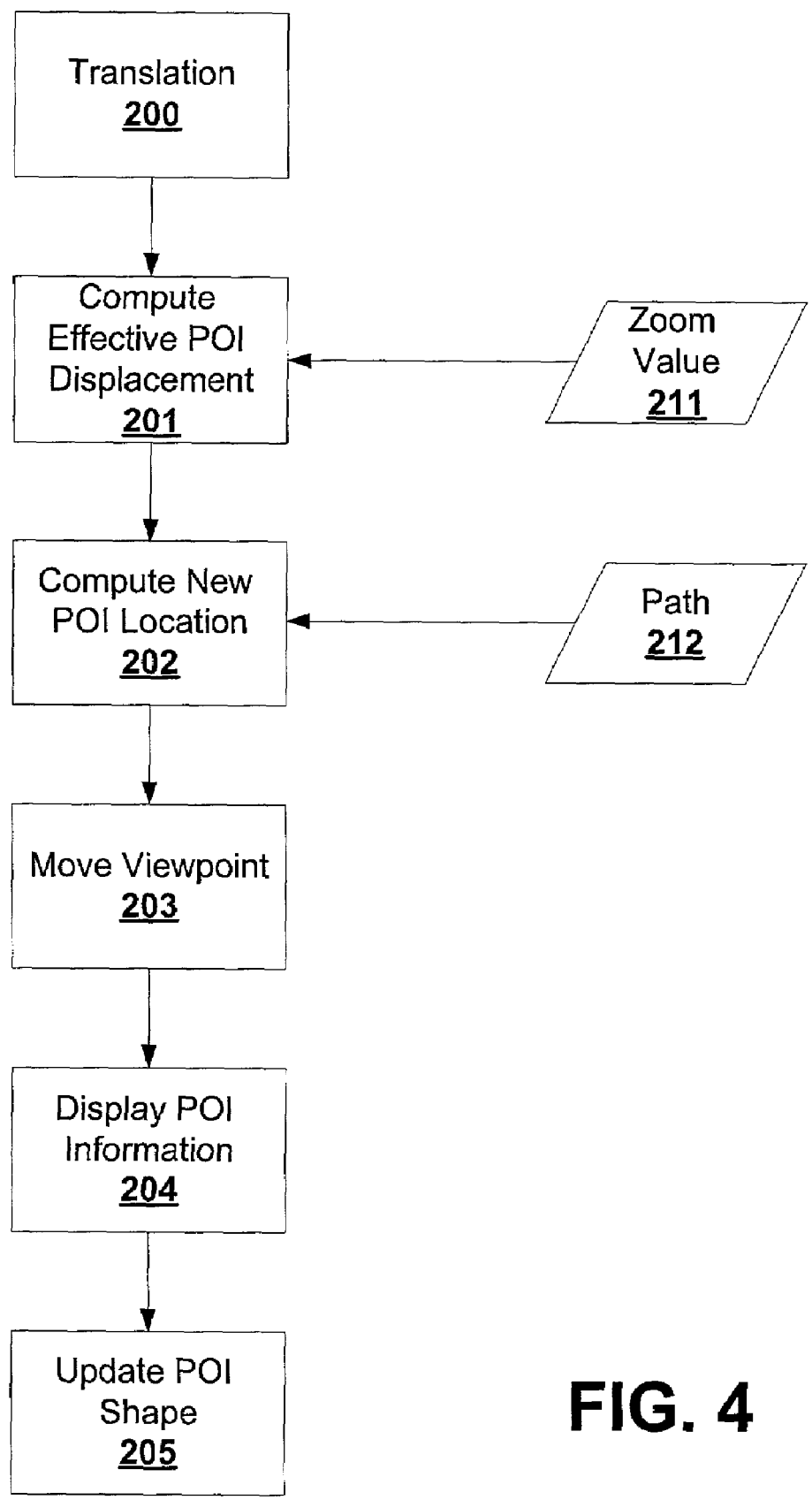
FIG. 4 is a flow-chart diagram illustrating a translation operation according to an embodiment of the invention.

FIG. 4 illustrates one example of a translation process in accord with the invention. A translation process moves a point $P(x,y,z)$ by a distance $D(\delta x, \delta y, \delta z)$ to a new location $P'(x',y',z')$. Thus, $P'(x',y',z')=P(x,y,z)+D(\delta x, \delta y, \delta z)$. The process handler 104 (see FIG. 3) relays a translation (move) request to a translation subroutine 200, which then computes the effective POI displacement (step 201). The computation may take into account the scaling factor (zoom value 211) to determine the rate at which to perform the requested transformation (see a later section for a discussion of the scale-dependent transformation). Once the amount of POI displacement is computed, the permissible POI location is then calculated (step 202) based on the path (reference shape) 212 that had been determined by the subroutine 101 (see FIG. 3). Once the POI 23 (see FIG. 2) is placed in the new location, the viewpoint (camera) is moved accordingly (step 203). At this stage the user-requested view is displayed in the viewing window and the POI-associated information is displayed (step 204). The POI-associated information may include any scene information (e.g., zoom factor, global orientation, or relative coordinate; see the following discussion for more details). Similarly, the shape or size of the POI symbol may be updated (step 205) in accordance with the new scene information. At this point, the program has completed the user-requested action, and the user input event 103 (see FIG. 3) subroutine is activated to await further user input.

Figure 5:
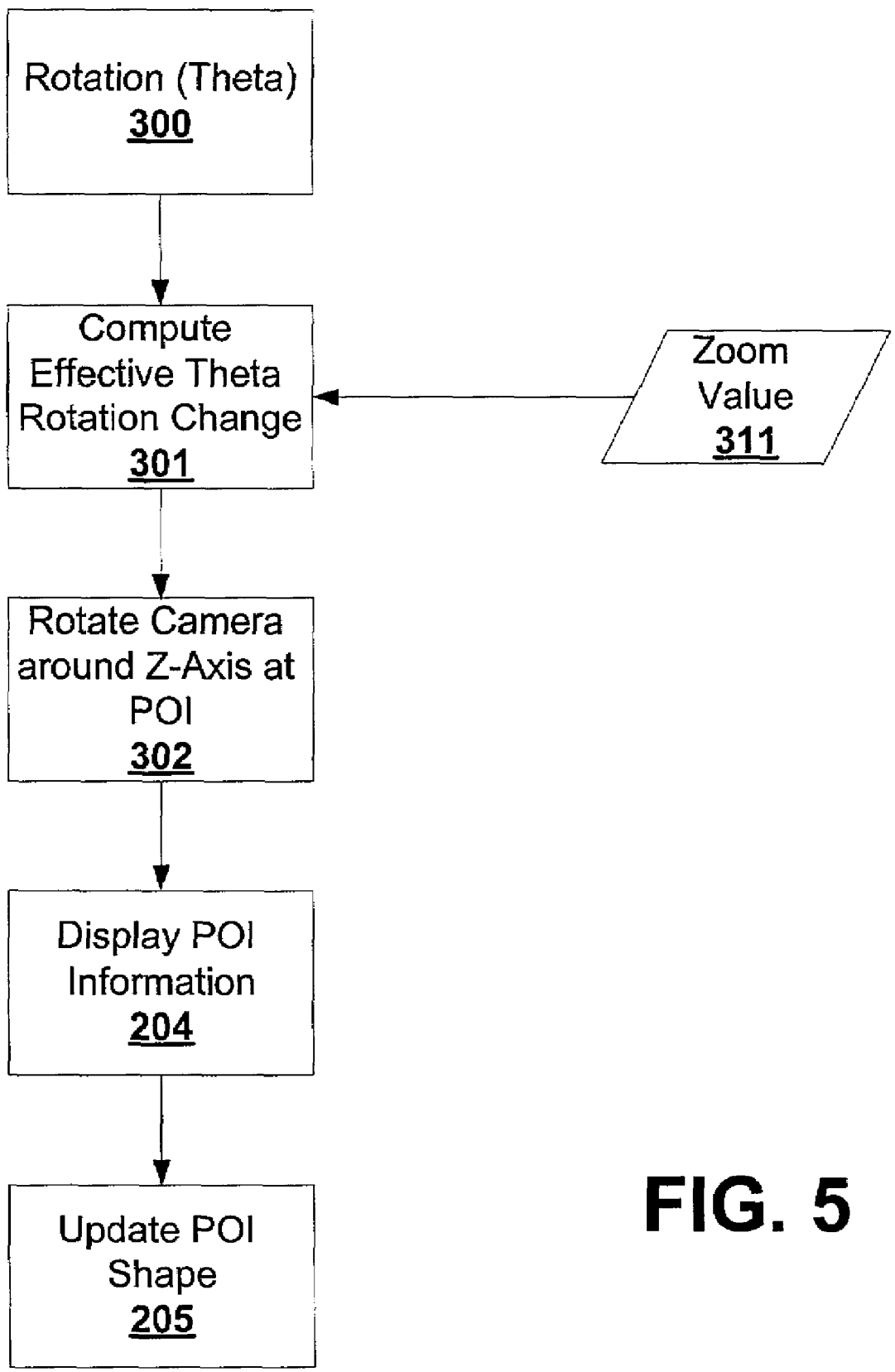
FIG. 5 is a flow-chart diagram illustrating a rotation operation according to an embodiment of the invention.

FIG. 5 illustrates an example of how to implement a rotation around the Z-axis. (The X, Y, and Z axes define the 3D scene-associated local coordinate system. The Z-axis is traditionally aligned vertically on the 2D display, and the Y-axis horizontally. The X-axis passes through the current viewpoint and the POI). The rotation around the Z-axis is often referred to as a Theta ($\theta$) rotation, which spins the image around a vertical axis. In this rotation, $P(x,y,z)$ is to be rotated about the vertical axis by an angle $\theta$ to a new location $P'(x',y',z)$. The transformation involves sine and cosine functions: $x'=x \times \cos(\theta) - y \times \sin(\theta)$ and $y'=x \times \sin(\theta) + y \times \cos(\theta)$.

In the implementation illustrated in FIG. 5, the rotation process 300 first computes an effective $\theta$ angle change (step 301). This computation may take into account the zoom factor (zoom value 311) of the displayed scene. After the effective $\theta$ change is computed, the program then rotates the camera (viewpoint) around the Z-axis at the POI (step 302) to display the new view. Again, the scene information associated with the POI may then be updated (step 204) and the shape of the POI may be changed accordingly (step 205). At this point, the program has completed the user-requested action, and the user input event 103 (see FIG. 3) subroutine is activated to await further user input.

Figure 6:
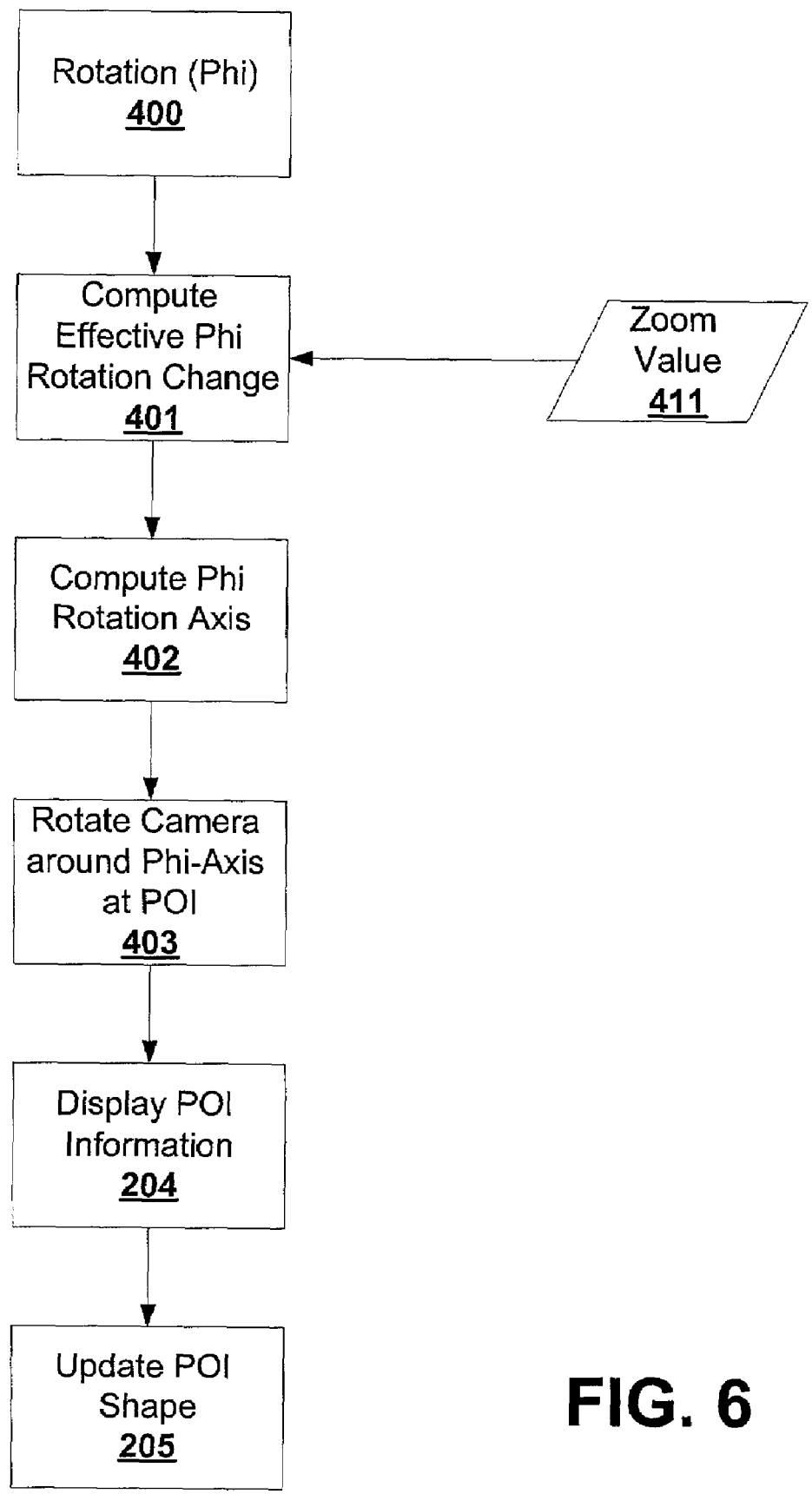
FIG. 6 is a flow-chart diagram illustrating another rotation operation according to an embodiment of the invention.

Related to the $\theta$ rotation is the rotation around the Y-axis on the 2D display plane. For example, FIG. 6 illustrates one implementation of the rotation around the Y-axis (Phi ($\Phi$) rotation). The $\Phi$ rotation process 400 first computes an effective $\Phi$ angle change (step 401) and the $\Phi$ axis (step 402), around which the rotation is to be performed. Again, the computation in step 401 may include the zoom value 411. Once these are computed, the camera (viewpoint) is then rotated around the $\Phi$ axis (step 403) to reach the final view. When the new view is displayed, the POI-associated information (step 204) and the shape of the POI (step 205) may be updated. At this point, the program has completed the user-requested action, and the user input event 103 (see FIG. 3) subroutine is activated to await further user input.

A rotation (Psi ($\Psi$) rotation) around the $\Psi$ axis, which is the X-axis that passes through the viewpoint and the POI, may be implemented in a similar fashion.

Figure 7:
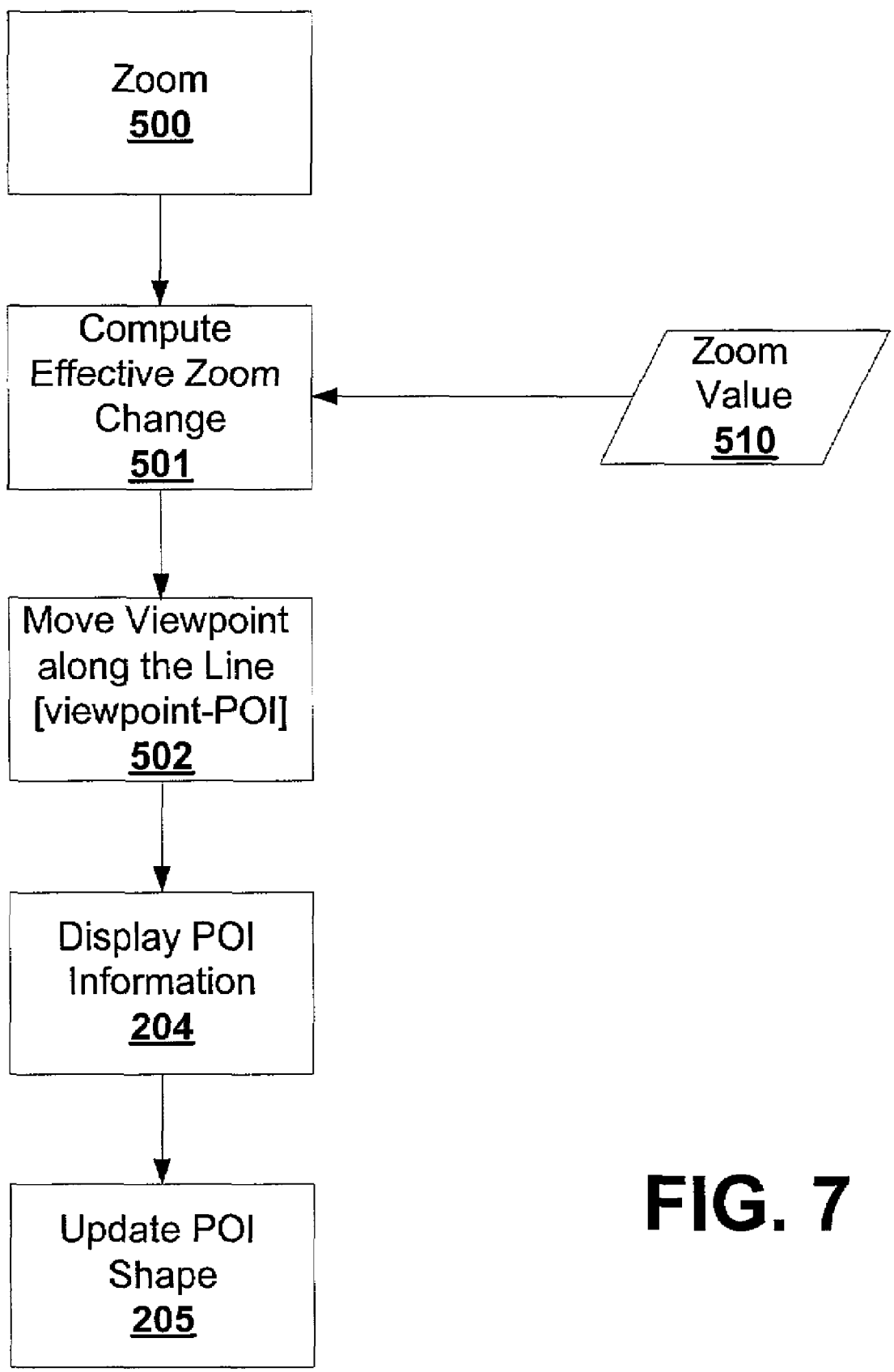
FIG. 7 is a flow-chart diagram illustrating a zoom operation according to an embodiment of the invention.

FIG. 7 illustrates a zoom (scaling) operation. In a zoom operation, a point $P(x,y,z)$ is to be moved to a new location $P'(x', y', z')$ according to a scaling factor $S(s_x,s_y,s_z)$ such that $x'=s_x \times x$, $y'=s_y \times y$, and $z'=s_z \times z$. The zoom process 500 first computes an effective zoom (scale) change (step 501), which may take into account the current scaling factor (zoom value 510). Once this is computed, the viewpoint (camera) is moved along a line that passes through the current viewpoint and the POI (i.e., the line of sight; step 502). Once a new view is displayed, the information on POI and its shape may be updated (steps 204 and 205). At this point, the program has completed the user-requested action, and the user input event 103 (see FIG. 3) subroutine is activated to await further user input.

The above examples are for illustration only. Those skilled in the art will appreciate that other alternatives are feasible without departing from the scope of the invention.

Figure 8:
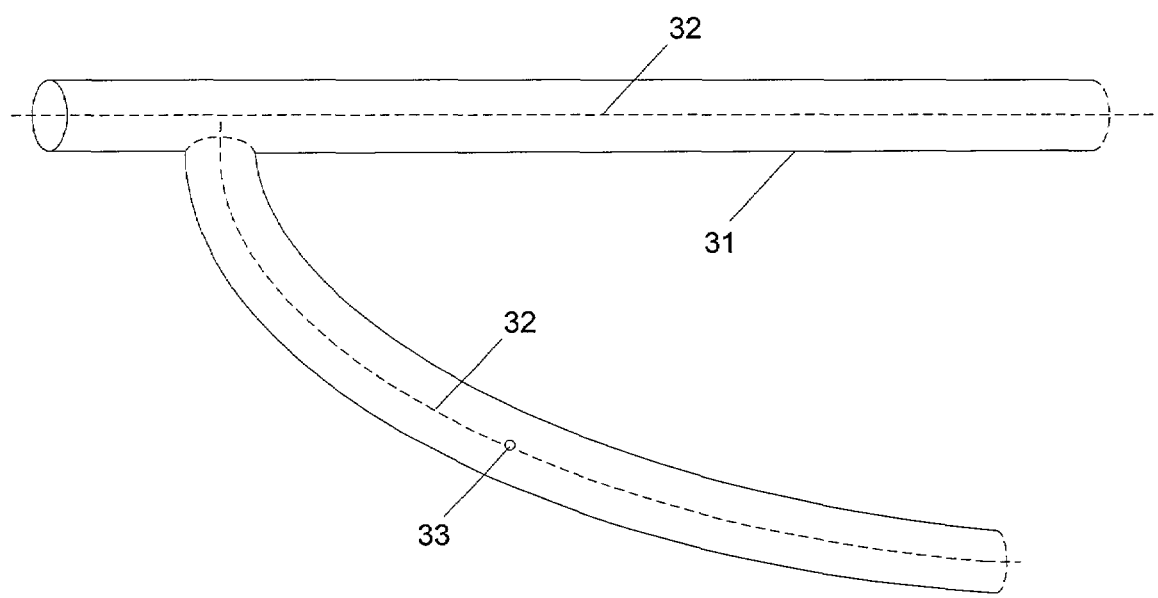
FIG. 8 is a diagram illustrating the association of a three-dimensional object, a reference shape, and a point of interest according to another embodiment of the invention.

In other embodiments of the invention, the 3D objects may comprise multiple thread-like structures connected in networks. These networks may include pipeline networks and road map networks; for example, FIG. 8 illustrates a section of such a network with a joint between individual thread-like elements. In this case, the 3D reference shape 32, within which the POI 33 is permitted to move, will run along the network 31. Again, the 3D reference shape 32 may comprise a network of "thin wires," as illustrated in FIG. 8. However, other shapes such as "thick wires" (cylinders) or hollow tubes should work as well. Similarly, the radii of such cylinders or hollow tubes may be smaller than, similar to, or slightly greater than that of the network object 31.

Figure 9:
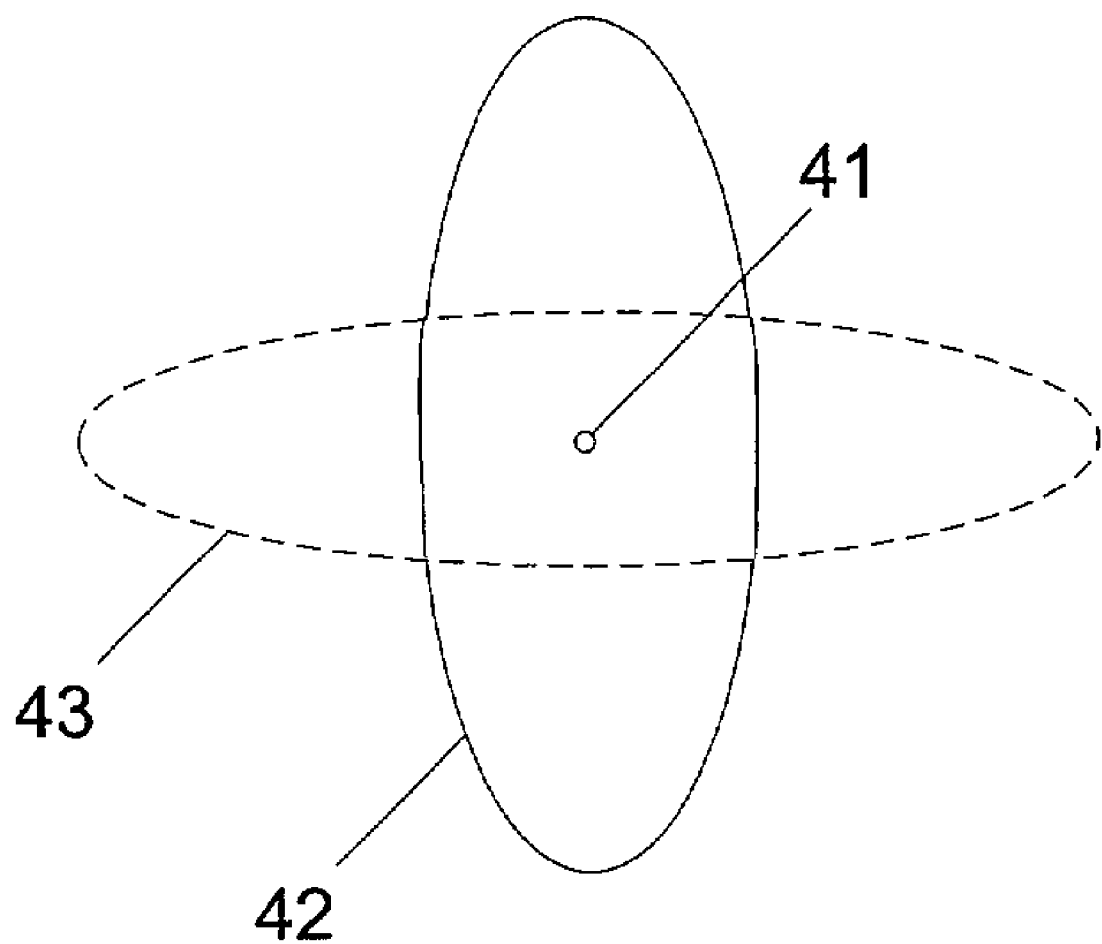
FIG. 9 is a diagram illustrating a way to represent scene information by a point of interest according to an embodiment of the invention.

Other embodiments of the invention allow the POI to convey scene information (e.g., magnification factor, the orientation (local orientation), and gravity direction (global orientation) of the scene, similar to a nautical compass). This can be achieved, for example, by associating one or more display objects (e.g., arrows or circles) with the POI 41 (see FIG. 9). As shown in FIG. 9, two circles 42 and 43 represent the north and up (away from earth center) directions with respect to the earth formation at the POI 41. The circles (or arrows) may use different colors to encode different information. Alternatively, they may use different shapes (solid line, dotted line, or dash line) to represent different information. The sizes of the display objects may be used to reflect the degree of magnification (scaling factor). This information keeps the user aware of the relative orientation of the 3D object in the scene.

Embodiments of the invention may relate to motion resolution in the display. When an input device (mouse, keyboard, etc.) is used to move the viewpoint (e.g., zoom, translate, or rotate), it is desirable that the motion proceeds according to the size of the 3D scene so that the magnitude of movement will be smaller in a zoomed in mode relative to a zoomed out mode. An embodiment of the invention may move the object with a resolution proportional to the distance between the camera and the POI. For example, in a rotation operation, the rotation angle ($d\alpha$) may be related to the magnitude of the mouse movement ($dx$) according to the following equation: $d\alpha = K \times dx$, where K is a function of the distance between the POI and the camera (viewpoint). Thus, the greater the distance between POI and the viewpoint, the quicker the rotation with the same magnitude of mouse movement. The closer the viewpoint from the well trajectory, the slower the motion is, making it easy to interact with the scene at any scale. This approach can be extended to all motion types: rotation, zoom, and translation.

Embodiments of the invention may relate to systems for displaying and manipulating 3D objects presented on display means. The systems may comprise computers, display means, and programs. The display means may be a computer monitor (e.g., a cathode ray terminal), a liquid crystal display (LCD), or a projector to project an image generated by a computer. A program in the embodiments of the invention uses a reference shape to restrict the location of a POI so that the 3D object remains in the viewing window. Such programs may further display points of interest (POIs) having scene information (e.g., a magnification factor, global orientation, or local orientation). Further, these programs may perform a user-requested transformation (translation, rotation, and zoom/scaling) at a rate that depends on the scene magnification factor. In one embodiment, the rate at which the program performs a user-requested transformation depends linearly on the distance between the POI and the viewpoint (camera).

What is claimed is:

1. A method for performing a user-requested action in a two-dimensional representation of a three dimensional object, comprising:
   tethering a point of interest with a referenced shape that is linked with a three-dimensional object;
   determining a distance between the point of interest and a viewpoint;
   determining an amount of movement from a user input; and
   performing the user-request action, while keeping the point of interest and the three-dimensional object within the viewing area by limiting movement of the point of interest based on the association of the point of interest and the reference shape, at a rate based on the artount of movement from the user input multiplied by a distance factor based on the distance between the point of interest and the viewpoint.

2. The method of claim 1, wherein the distance factor is linearly dependent on the distance between the point of interest and the viewpoint.

3. The method of claim 1, wherein the user-requested action comprises one selected from translation, rotation, and zoom.

4. The method of claim 2, wherein the user-requested action comprises one selected from translation, rotation, and zoom.

5. The method of claim 1, wherein the point of interest comprises scene information.

6. The method of claim 5 wherein the scene information comprises at least one selected from scene magnification, global orientation, and local orientation.

7. The method of claim 5 wherein the distance factor is linearly dependent on the distance between the point of interest and the viewpoint.

8. The method of claim 1, wherein the point of interest is fixed at a point within the viewing area.

9. The method of claim 8 wherein the point is the center of the viewing area.

10. The method of claim 8 wherein the distance factor is linearly dependent on the distance between the point interest and the viewpoint.

11. The method of claim 1, wherein the three-dimensional object comprises a thread-like object.

12. The method of claim 11 wherein the distance factor is linearly dependent on the distance between the point of interest and the viewpoint.

13. The method of claim 11 wherein the thread-like object comprises a representation of a well trajectory.

14. The method of claim 13 wherein the reference shape comprises a wire.

15. The method of claim 14, wherein the wire runs along a longitudinal axis of the well trajectory.

16. The method of claim 13, wherein the reference shape comprises a cylinder.

17. The method of claim 16, wherein the cylinder has a diameter smaller than a diameter of the well trajectory.

18. The method of claim 16, wherein the cylinder has a diameter substantially identical to a diameter of the well trajectory.

19. The method of claim 13, wherein the reference shape comprises a cylindrical surface substantially along the well trajectory.

20. The method of claim 1, wherein the three-dimensional object comprises a representation of a network.

21. The method of claim 20 wherein the distance factor is linearly dependent on the distance between the point of interest and the viewpoint.

22. The method of claim 20 wherein the network comprises pipelines.

23. The method of claim 20, wherein the reference shape comprises curves running along the network.

24. The method of claim 20 wherein the reference shape comprises cylinders running substantially along the network.

25. The method of claim 20 wherein the reference shape comprises cylindrical surfaces running substantially along the network.

* * * * *